United States Patent [19] [11] 4,232,352
Menju et al. [45] Nov. 4, 1980

[54] PROTECTIVE GAP DEVICES FOR PROTECTING CIRCUIT BREAKERS

[75] Inventors: Shinichi Menju, Atsugi; Iwao Ohshima, Tokyo; Shigeru Takahashi, Yokohama, all of Japan

[73] Assignee: Tokyo Shibaura Denki Kabushiki Kaisha, Tokyo, Japan

[21] Appl. No.: 924,069

[22] Filed: Jul. 12, 1978

[30] Foreign Application Priority Data

Jul. 19, 1977 [JP] Japan .................................. 52-85670

[51] Int. Cl.[3] .............................................. H02H 3/22
[52] U.S. Cl. .................................... 361/120; 361/129; 313/306; 313/325
[58] Field of Search ........................ 361/120, 129, 117; 313/306, 307, 308, 301, 313, 293, 296, 298, 297, 299, 300, 198, 217, 231.1, 325; 315/36

[56] References Cited

U.S. PATENT DOCUMENTS

| | | | |
|---|---|---|---|
| 3,218,499 | 11/1965 | Jennings | 313/306 X |
| 3,271,619 | 9/1966 | Lafferty | 361/120 X |
| 3,303,376 | 2/1967 | Lafferty | 313/198 X |
| 3,328,632 | 6/1967 | Robinson | 361/120 X |
| 3,366,825 | 1/1968 | Lafferty | 313/325 X |
| 3,465,205 | 9/1969 | Lafferty | 313/198 X |

*Primary Examiner*—Patrick R. Salce
*Attorney, Agent, or Firm*—Stevens, Davis, Miller & Mosher

[57] ABSTRACT

In a protective gap device for protecting a circuit breaker, there are provided a cylindrical metalic shell, a high voltage electrode unit, and a low voltage electrode unit. The high and low voltage electrode units are respectively provided with a main electrode, a trigger electrode, and a cylindrical electrode plate, each of the trigger electrodes having a rod-shaped electrode so as to form a trigger gap between the main electrode and the trigger electrode.

3 Claims, 3 Drawing Figures

PROTECTIVE GAP DEVICES FOR PROTECTING CIRCUIT BREAKERS

BACKGROUND OF THE INVENTION

This invention relates to an arrestor of an electric power transmission line and more particularly to a protective gap device for protecting a gas filled circuit breaker against steep lightning surges.

In a known gas filled circuit breaker, insulation coordination has been established by using an air gap, but in such a prior art circuit breaker the discharge voltage-time characteristic (V-t characteristic) builds up at the steep wave front of the incoming surge voltage so that the V-t characteristics vary depending upon the steepness of the wave front. For this reason it has been difficult to protect a gas filled circuit breaker having a relatively flat V-t characteristic against surge voltages having a steep wave front.

FIG. 1 shows one example of a prior art protective gap device used for a gas filled circuit breaker to obviate such defect as described above, and the protective gap device comprises a metal shell 1 filled with a gas having an excellent arc extinguish characteristic, a high voltage electrode 3, and a low voltage electrode 12 which are opposed each other in the shell 1. This protective gap device manifests a discharge characteristic having a relatively flat V-t characteristic and no polarity effect. However, in order to satisfactorily protect the gas filled circuit breaker against a steep lightning surge and to satisfactorily reclose the circuit breaker, it is necessary that the V-t characteristic should be always higher than the gentle wave front discharge starting voltage of the protective gap device and should be lower than the basic impulse level (B.I.L.) which is predetermined for the protective gap device. In the protective gap device shown in FIG. 1, although a trigger electrode 13 is provided at the center of the low voltage electrode, due to the sluggish operation of the trigger electrode and a small number of ions created by the operation of the trigger electrode and supplied between electrodes 3 and 12, the discharge between the electrodes 3 and 12 gently lags the incoming surge voltage whereby it is difficult to obtain the desired flat V-t characteristic of the gas.

SUMMARY OF THE INVENTION

Therefore, it is an object of this invention to provide an improved protective gap device manifesting an excellent discharge characteristic having a flat V-t characteristic.

Another object of this invention is to provide a protective gap device having a remarkable trigger effect thus ensuring substantially constant discharge voltage.

According to this invention, there is provided a protective gap device for protecting a circuit breaker of the type comprising a cylindrical metal shell filled with arc extinguishing medium, a high voltage electrode unit, and a low voltage electrode unit which are contained in the shell to oppose with each other, and the protective gap device is characterized in that the high voltage electrode unit comprises a first main electrode supported by an insulating member which closes one end of said shell, and a first trigger electrode secured to the first main electrode through an insulating member, and that the low voltage electrode unit comprises a second trigger electrode secured to a grounded metal plate closing the other end of the shell, a second main electrode attached to the metal plate through an insulating support, and a metal cylinder connected electrically to the second main electrode of the low voltage electrode unit and spaced from the metal shell.

DESCRIPTION OF THE PREFERRED EMBODIMENT

Figure 2:
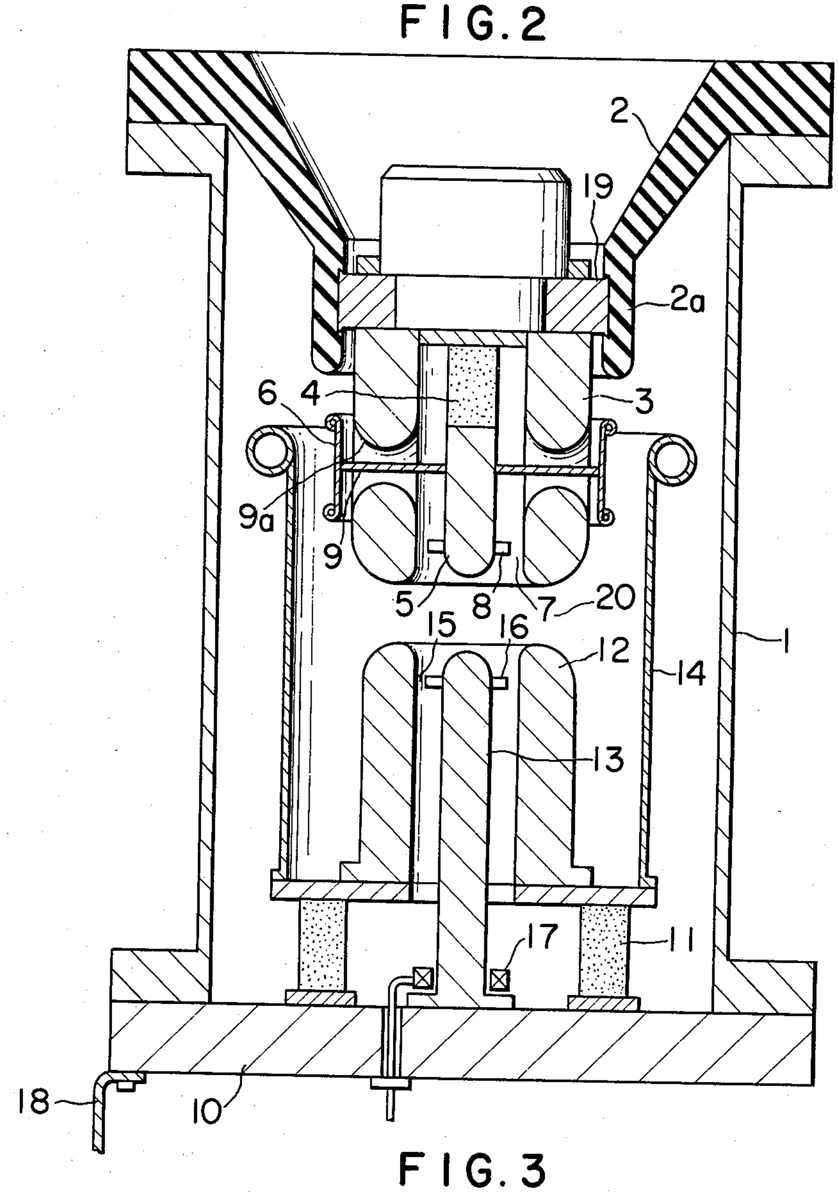
FIG. 2 is a longitudinal sectional view of a protective gap device according this invention.

Referring to FIG. 2 a protective gap device according to this invention comprises a metal shell 1, a high voltage electrode unit secured to one open end of the metal shell, and a low voltage electrode unit secured to the other open end of the shell.

The high voltage electrode unit comprises a cylindrical main electrode 3 connected to the inner end 2*a* of a hollow frusto-conical insulating spacer 2 through a supporting member 19, a trigger electrode 5 disposed in and connected to the main electrode 3 through an insulating rod 4, and a short cylindrical electrode plate 6 connected electrically to the trigger electrode 5 and disposed a predetermined distance from the main electrode 3. A horizontal rod-shaped electrode 8 is secured near the free end of the trigger electrode 5 to form a discharge gap 7 between the main electrode 3 and the trigger electrode 5. The main electrode 3 is provided with a plurality of holes 9*a* to pass conductors 9 for connecting the electrode plate 6 to the trigger electrode 5.

The low voltage electrode unit comprises a cylindrical main electrode 12 secured through an insulating support 11 to a metal end plate 10 closing the lower open end of the metalic shell 1, a trigger electrode 13 mounted on the end plate 10 so as to be positioned within the main electrode 12, and a cylindrical electrode plate 14 surrounding the high voltage electrode unit and the main electrode 12 of the low voltage electrode unit. The electrode plate 14 is disposed at a position a predetermined distance spaced from the metal shell 1 so as to form a coaxial cylindrical electrostatic capacitor between the electrode plate 14 and the metal shell 1. The electrode plate 14 is also electrically connected to the main electrode 12. A horizontal rod-shaped electrode 16 is secured to the trigger electrode 13 near the upper end thereof so as to form a discharge gap 15 between the trigger electrode 13 and the main electrode 12 of the low voltage electrode unit. A coil 17 for detecting discharge current may be disposed around the trigger electrode 13 as occasion demands, and a grounding conductor 18 is attached to the outside surface of the metal end plate 10.

It is desirable to use an arc resistant material such as graphite or Cu-W alloy for constructing the main electrodes 3, 12, the trigger electrodes 5, 13, and the rod-shape electrodes 8, 16. A gas having excellent arc extinguishing capability, such as sulfur hexafluoride ($SF_6$) gas, fills the interior of the main body defined by the metal shell 1, the insulating spacer 2, and the metal end plate 10.

The operation of the protective gap device according to this invention will now be described hereunder.

In the protective gap device constructed as described above, coaxial cylindrical electrostatic capacitors are formed between the main electrode 3 and the electrode plate 6 and between the metal shell 1 and the electrode plate 14. Thus, when over voltage is applied to the main electrode 3, the over voltage is shared among the trigger gap 7, the gap 20 between the main electrodes 3 and 12, and the trigger gap 15. The geometrical dimensions of the electrode plates 6 and 14 are predetermined so as to induce discharge at the gap 20 between the main electrodes 3 and 12 by the initial discharges simultaneously created at the trigger gaps 7 and 15. Thus, the characteristic feature of the protective gap device of this invention resides in that the discharge between the main electrodes 3 and 12 is induced by two trigger discharges at the gaps 7 and 15 created by the over voltage.

Further, although in FIG. 2, the high voltage electrode unit is provided with the ring-shaped electrode plate 6 electrically connected to the trigger electrode 5, if a line voltage is not so large, the electrode plate 6 may be eliminated, and in such a protective gap device the discharge between the main electrodes 3 and 12 can be sufficiently induced by two trigger discharges at the gaps 7 and 15.

Figure 1:
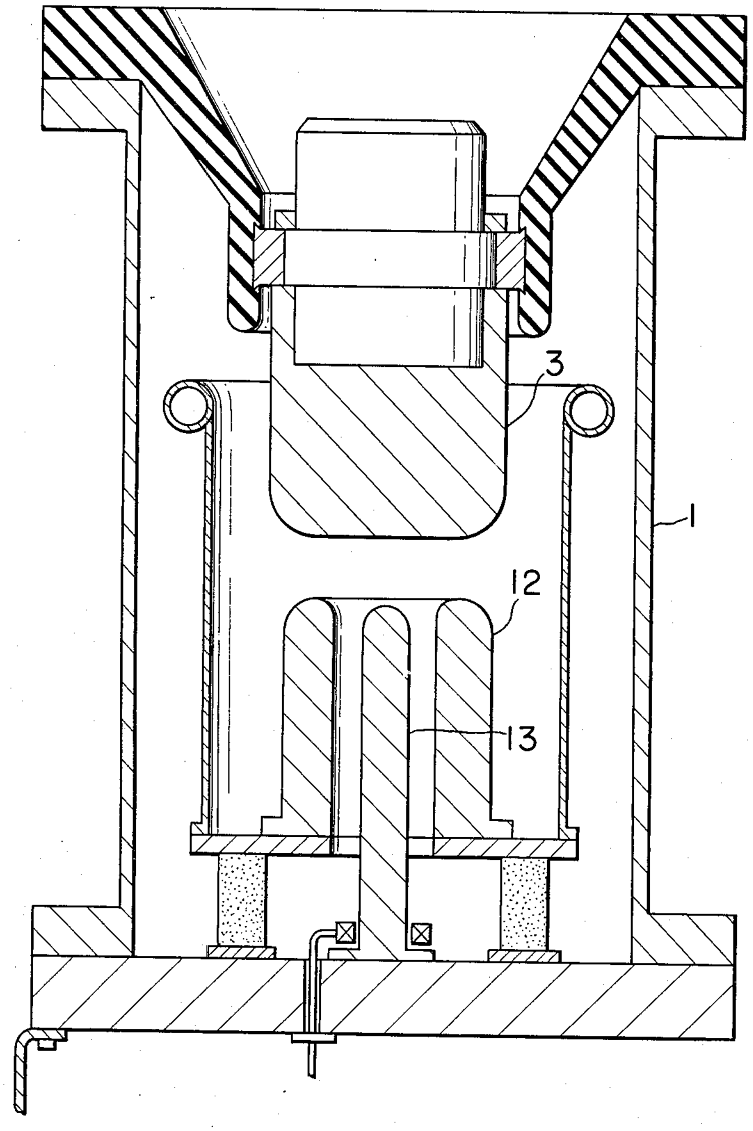
FIG. 1 PRIOR ART
FIG. 1 is a longitudinal sectional view of a prior art protective gap device used for protecting a gas filled circuit breaker.
Figure 3:
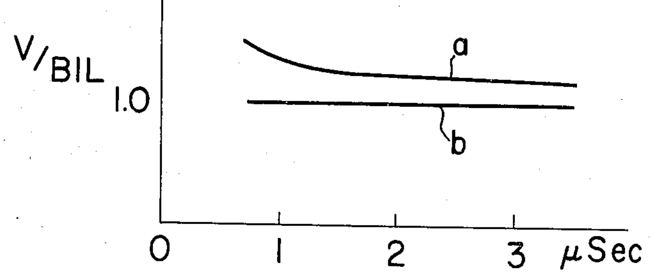
FIG. 3 is a graph representing V-t characteristics a and b of the protective gap devices shown in FIG. 1 and FIG. 2, respectively.

FIG. 3 is a graph in which a curve a represents a V-t characteristic of the prior art protective device shown in FIG. 1 and a curve b represents that of the protective gap device according to this invention. As is apparent from FIG. 3, the curve a builds up at the steep wave front of the surge voltage, but the curve b is substantially flat showing that the variation of the discharge voltage has been remarkably reduced. Furthermore, in the protective gap device of this invention, since the main discharge is induced by the ions or ultraviolet radiations formed by two trigger discharges, the trigger effect is remarkably enhanced. Moreover, since ring shaped metal electrode 6 greatly improves the voltage distribution between the main electrodes and between the main and the trigger electrodes, the time lags of the operation of the trigger electrodes can be reduced.

We claim:

1. A protective gap device for protecting a circuit breaker comprising a cylindrical metal shell filled with an arc extinguishing medium; a high voltage electrode unit including a first main electrode supported by an insulating member which is arranged to close one end of said shell, a first trigger electrode secured to said first main electrode, and a ring-shaped metal member surrounding said first main electrode and connected electrically to said first trigger electrode through conductors which extend through a plurality of holes provided in said first main electrode; and a low voltage electrode unit including a second trigger electrode secured to a grounded metal plate closing the other end of said shell, a second main electrode attached to said grounded metal plate, and a metal cylinder connected electrically to said second main electrode and spaced from said metal shell.

2. The protective gap device according to claim 1 wherein said first trigger electrode of said high voltage electrode unit is provided with a first rod-shaped electrode so as to form a first discharge gap between said first trigger electrode and said first main electrode of the high voltage electrode unit, and said second trigger electrode of said low voltage electrode unit is provided with a second rod-shaped electrode so as to form a second gap between said second trigger electrode and said second main electrode of the low voltage electrode unit.

3. The protective gap device according to claim 1 wherein said arc extinguishing medium filling said shell is sulfur hexafluoride gas.

* * * * *